(12) United States Patent
Fujino et al.

(10) Patent No.: US 7,112,935 B2
(45) Date of Patent: Sep. 26, 2006

(54) CURRENT SENSOR USING MIRROR MOSFET AND PWM INVERTER INCORPORATING THE SAME

(75) Inventors: Shinichi Fujino, Mito (JP); Junichi Sakano, Hitachi (JP); Toshiyuki Innami, Mito (JP); Kohsei Goto, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/251,768

(22) Filed: Oct. 18, 2005

(65) Prior Publication Data

US 2006/0038523 A1   Feb. 23, 2006

Related U.S. Application Data

(63) Continuation of application No. 10/738,136, filed on Dec. 18, 2003.

(30) Foreign Application Priority Data

Dec. 19, 2002   (JP)   ............. 2002-367856

(51) Int. Cl.
*H02P 7/29* (2006.01)
*G05F 1/56* (2006.01)

(52) U.S. Cl. .................. 318/433; 323/315; 323/317

(58) Field of Classification Search ............ 318/569, 318/599–601, 650, 432–434; 323/311–317
See application file for complete search history.

(56) References Cited

U.S. PATENT DOCUMENTS

| 3,835,356 A | * | 9/1974 | Soderholm ............... 318/768 |
| 4,270,159 A | * | 5/1981 | Buckle .................... 361/79 |
| 4,291,355 A | * | 9/1981 | Dinger .................... 361/31 |
| 4,422,040 A | * | 12/1983 | Raider et al. ............ 324/772 |
| 4,599,554 A |   | 7/1986 | Jaycox et al. |
| 4,709,163 A |   | 11/1987 | Kasperkovitz |
| 5,027,251 A | * | 6/1991 | Hirota et al. ............. 361/18 |
| 5,136,138 A | * | 8/1992 | Gilliland ............... 219/130.1 |
| 5,159,425 A | * | 10/1992 | Zommer .................. 257/337 |
| 5,272,392 A | * | 12/1993 | Wong et al. .............. 327/109 |
| 5,324,989 A | * | 6/1994 | Thornton ................. 307/35 |
| 5,587,863 A | * | 12/1996 | Bergstrom et al. ......... 361/93.9 |
| 5,815,012 A | * | 9/1998 | Rivoir et al. ............. 327/103 |
| 5,900,960 A | * | 5/1999 | Reime .................... 398/202 |
| 5,903,422 A | * | 5/1999 | Hosokawa ............... 361/93.1 |
| 5,909,112 A | * | 6/1999 | Kiyota et al. ............ 323/315 |
| 6,194,910 B1 | * | 2/2001 | Davis et al. ............. 324/765 |
| 6,281,743 B1 | * | 8/2001 | Doyle .................... 327/539 |

(Continued)

FOREIGN PATENT DOCUMENTS

JP   58-166512   1/1983

(Continued)

*Primary Examiner*—Bentsu Ro
(74) *Attorney, Agent, or Firm*—Crowell & Moring LLP

(57) ABSTRACT

A current sensor has a power MOSFET Q1, connected between an electric load and a power supply, for controlling current that flows through said electric load, a mirror MOSFET Q2, connected in parallel to said power MOSFET Q1, in which a portion of the current flowing through said power MOSFET flows, and a current detection resistor RC connected between a source electrode of said power MOSFET and a source electrode of said mirror MOSFET. An inverting amplifier circuit CP of the current sensor 3 inverts and amplifies the voltage signal, which has been converted to voltage by the current detection resistor RC, and outputs the signal, thereby converting positive and negative voltages generated across the current detection resistor RC to a positive voltage.

7 Claims, 5 Drawing Sheets

U.S. PATENT DOCUMENTS 6,301,137 B1 10/2001 Li
6,472,910 B1 * 10/2002 Niimi .......................... 327/108
6,486,681 B1 * 11/2002 Weber et al. ............... 324/662
6,812,722 B1 * 11/2004 Throngnumchai et al. .. 324/760

FOREIGN PATENT DOCUMENTS

| | | |
|---|---|---|
| JP | 58-127517 | 7/1983 |
| JP | 58-218658 A | 12/1983 |
| JP | 06-351280 | 12/1994 |
| JP | 08-086818 | 4/1996 |
| JP | 9-49858 A | 2/1997 |
| JP | 10-256541 | 9/1998 |
| JP | 11-214998 | 8/1999 |
| JP | 2000-193692 | 7/2000 |
| WO | WO 89/12361 A1 | 12/1989 |

* cited by examiner

CURRENT SENSOR USING MIRROR MOSFET AND PWM INVERTER INCORPORATING THE SAME

BACKGROUND OF THE INVENTION

The present invention relates to a current sensor and a PWM (Pulse Width Modulation) inverter that uses the current sensor, and particularly relates to a current sensor which is suitable for detecting currents flowing in both the positive and negative directions and a PWM inverter which incorporates said current sensor.

Conventionally in automobiles, a power MOSFET (Metal Oxide Semiconductor Field Effect Transistor), which is a switching element for controlling electrical components of the automobile, is used to control current flowing through electrical components. If a current flows for a long time or an overcurrent occurs, the power MOSFET itself generates heat causing a thermal breakdown to occur. Furthermore, in a PWM inverter that uses a power MOSFET for controlling three-phase alternating current, current flows through the power MOSFET in two directions: from a drain electrode of the power MOSFET to a source electrode, and the reverse direction.

Therefore, for example, as disclosed in the Japanese Application Patent Laid-open Publication No. Hei 06-351280, a technique is known that utilizes an insulated current sensor that uses a Hall element to detect current or utilizes a shunt resistor and a sample-and-hold circuit to detect current.

However, a current detection means that uses an insulated current sensor or uses both a shunt resistor and a sample-and-hold circuit requires a separate device or circuit, resulting in increasing both the current sensor cost and the size of the PWM inverter, which is a problem.

On the other hand, for example, another known technique has been disclosed in the Japanese Application Patent Laid-open Publication No. 2000-193692. Therein, a series circuit of a mirror MOSFET and a current detection resistor is connected in parallel to the power MOSFET, and a voltage across the current detection resistor is compared with the reference voltage by a comparator, and if a voltage that exceeds the reference voltage has been applied to the current detection resistor, it is considered that an overcurrent has flown through the power MOSFET, and the current is shut down to prevent the power MOSFET from being damaged.

However, there is a problem that the current detection method described in the Japanese Application Patent Laid-open Publication No. 2000-193692 cannot be applied to the current detection of the PWM inverter because it is impossible for the method to detect both a current in the positive direction and a current in the negative direction. That is, a current sensor that uses a comparator in addition to a mirror MOSFET and a current detection resistor that are connected in parallel to a power MOSFET is a means for detecting an overcurrent when a current flows through the power MOSFET from the drain electrode to the source electrode. Therefore, it is difficult to detect a reverse current, that is, a forward current flowing through a parasitic diode of the power MOSFET. For example, when a current flows in the same direction as the forward current flowing through the parasitic diode of the power MOSFET, the voltage signal of the current detection resistor becomes negative, and when a current flows from the drain electrode of the power MOSFET to the source electrode, the signal becomes positive. It is difficult for the comparator to detect both of those voltage signals, and therefore, there is a problem that the method cannot be applied to the current detection of the PWM inverter.

Furthermore, when a current flows through each parasitic diode of the power MOSFET and the mirror MOSFET, the relationship between the current value and the voltage drop value of each parasitic diode is non-linear, and the current detection resistor is linear. Therefore, when a current flows through each parasitic diode, the ratio of the current flowing through the power MOSFET to the current flowing through the mirror MOSFET varies according to the value of the flowing current, which may cause an area in which the voltage drop value of the current detection resistor becomes almost equal to that of the power MOSFET. In this area, regardless of an increase or decrease of the current that flows through the power MOSFET, the current flowing through the mirror MOSFET does not change. As a result, in this area, it is not possible to accurately detect current that flows through the power MOSFET.

SUMMARY OF THE INVENTION

An object of the present invention is to provide a current sensor that does not require a separate device or circuit for current detection and can detect currents both in the positive and negative directions, and also to provide a small and inexpensive PWM inverter that uses said current sensor.

1. To achieve the above objectives, the present invention comprises a power MOSFET, connected between an electric load and a power source, for controlling current that flows through said electric load, a mirror MOSFET, connected in parallel to said power MOSFET, wherein a portion of the current that flows through said power MOSFET flows, a current detection resistor connected between a source electrode of said power MOSFET and a source electrode of said mirror MOSFET, and a converting means for converting positive and negative voltages generated across said current detection resistor into a positive or negative voltage.

That configuration does not require a separate device or circuit for current detection and can detect both positive and negative currents.

2. In the above-mentioned Item 1, preferably, said converting means is an inverting amplifier circuit that inverts and amplifies a voltage signal, which has been converted into voltage by said current detection resistor, and outputs the signal.

3. In the above-mentioned Item 1, preferably, said converting means is a level converting circuit that increases or decreases the level of the voltage signal, which has been converted into voltage by said current detection resistor.

4. In the above-mentioned Item 1, preferably, the resistance value of said current detection resistor is determined so that a value obtained as the result of the current Imain, which flows through said power MOSFET or a parasitic diode of said power MOSFET, being divided by the mirror ratio X of said power MOSFET to said mirror MOSFET and then multiplied by the resistance value Rrc of said current detection resistor is less than the voltage drop value VD of said power MOSFET or the parasitic diode of said power MOSFET when said current is flowing.

5. To achieve the above objectives, the present invention comprises a power MOSFET, connected between an electric load and a power source, for controlling current that flows through said electric load, a mirror MOSFET, connected in parallel to said power MOSFET, wherein a portion of the current that flows through said power MOSFET flows, a current detection resistor connected between a source electrode of said power MOSFET and a source electrode of said mirror MOSFET, and a converting means for converting positive and negative voltages generated across said current detection resistor into digital signals.

That configuration does not require a separate device or circuit for current detection and can detect both positive and negative currents.

6. To achieve the above objectives, the present invention provides a PWM inverter having three phases of arms, connected in parallel to a DC (direct current) power source, each phase consisting of an upper arm and a lower arm which function in pairs so as to control alternating current, and current sensors disposed at either all of the upper arms or the lower arms of said three phases, wherein said current sensor consists of a power MOSFET, connected between an electric load and a power source, for controlling current that flows through said electric load, a mirror MOSFET, connected in parallel to said power MOSFET, wherein a portion of the current that flows through said power MOSFET flows, a current detection resistor connected between a source electrode of said power MOSFET and a source electrode of said mirror MOSFET, and a converting means for converting positive and negative voltages generated across said current detection resistor into a positive or negative voltage; and said PWM inverter further having a driving device for detecting current of each phase based on the current detection signal outputted from said current sensor of each phase when all of the arms located on the opposite side of the arms where said current sensors are disposed are turned OFF within the PWM switching period, thereby controlling alternating current.

This configuration enables a small and inexpensive PWM inverter.

BRIEF DESCRIPTION OF DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENT

The present invention will be discussed hereinafter in detail in terms of the preferred embodiment of a current sensor and a PWM inverter that uses the current sensor according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 2:
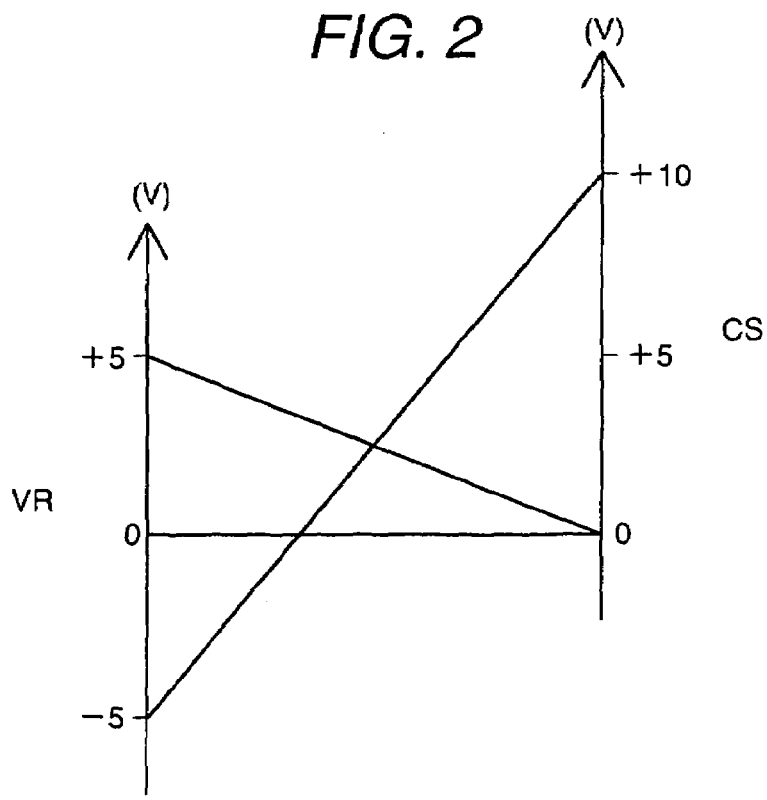
FIG. 2 is an explanatory diagram which explains characteristics of the inverting amplifier circuit used for a current sensor according to a first embodiment of the present invention.
Figure 3:
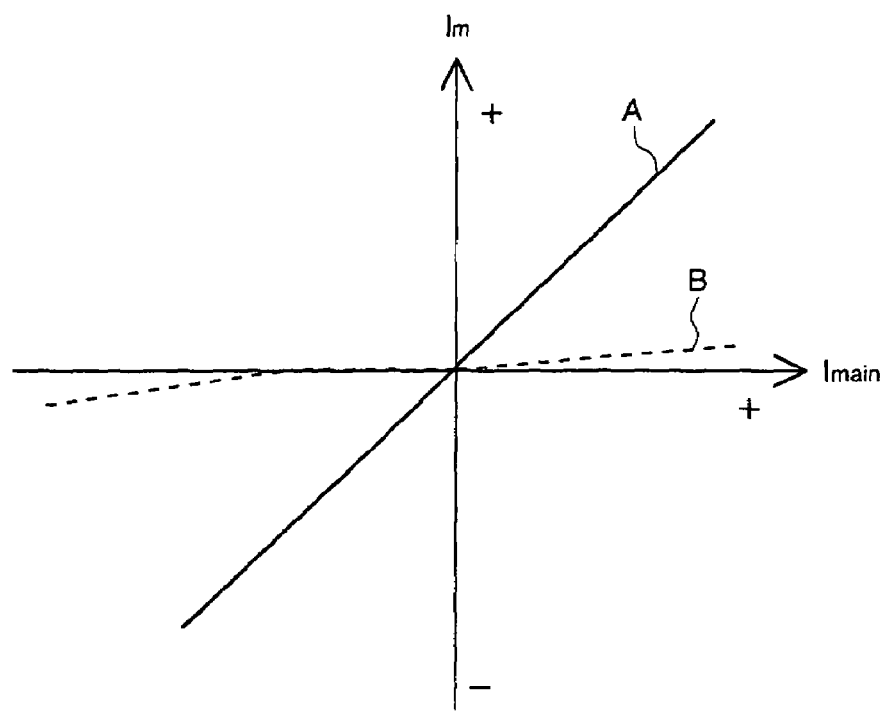
FIG. 3 is an explanatory diagram which explains operations of the current sensor according to a first embodiment of the present invention.

Hereafter, with reference to FIGS. 1 through 3, the configuration of a current sensor according to a first embodiment of the present invention will be described.

Figure 1:
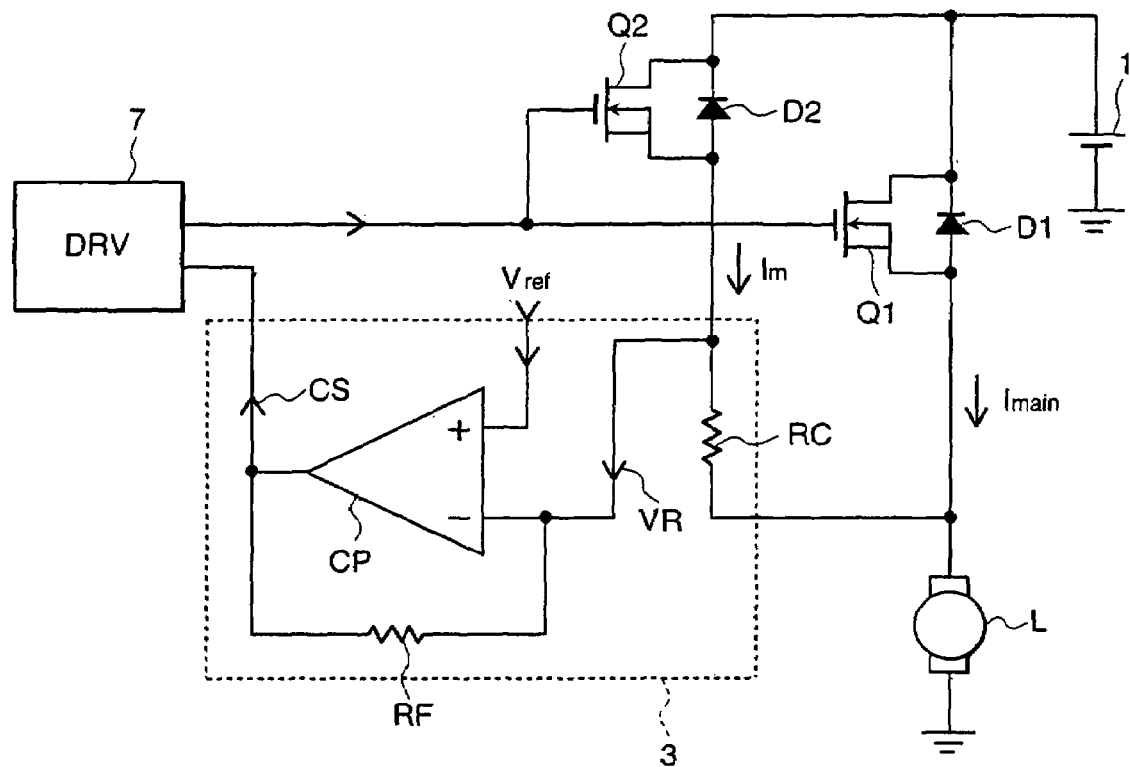
FIG. 1 is a circuit diagram which shows the configuration of a current sensor according to a first embodiment of the present invention.

FIG. 1 is a circuit diagram that shows the configuration of a current sensor according to a first embodiment of the present invention. FIG. 2 is an explanatory diagram that explains characteristics of an inverting amplifier circuit used for a current sensor according to a first embodiment of the present invention. FIG. 3 is an explanatory diagram that explains operations of a current sensor according to a first embodiment of the present invention.

Power MOSFET Q1 and mirror MOSFET Q2 shown in FIG. 1 are created on the same chip. Due to the MOSFET structure, the power MOSFET Q1 and the mirror MOSFET Q2 have parasitic diodes D1 and D2, respectively. Each drain electrode of the power MOSFET Q1 and the mirror MOSFET Q2 is connected to a DC power source 1, and each gate electrode is connected to a driving device (DRV) 7. A current sensor 3 is connected between the source electrode of the mirror MOSFET Q2 and the source electrode of the power MOSFET Q1. Current detection signal CS of the current sensor 3 is inputted into the driving device 7. Electric load L is connected to the source electrode of the power MOSFET Q1. The driving device 7 turns ON and OFF the power MOSFET Q1 and the mirror MOSFET Q2 by using the current detection signal CS in order to control current Imain that flows through the electric load L.

The current sensor 3 consists of operational amplifier CP, current detection resistor RC and feedback resistor RF. The current detection resistor RC is connected between the source electrode of the power MOSFET Q1 and the source electrode of the mirror MOSFET Q2. One input terminal (negative input terminal) of the operational amplifier CP is connected to the source electrode of the mirror MOSFET Q2 and reference voltage Vref is inputted to the other input terminal (positive input terminal). Furthermore, an output terminal of the operational amplifier CP is connected to the driving device 7. The feedback resistor RF is connected between the operational amplifier CP's output terminal and its input terminal to which the source electrode of the mirror MOSFET Q2 is connected. In this configuration, current Im that flows through the mirror MOSFET Q2 is converted to voltage signal VR by the current detection resistor RC, and the voltage signal VR is inverted and amplified by the operational amplifier CP, and the signal is then outputted as current detection signal CS. The amplification factor of the operational amplifier CP can be determined according to the ratio (Rrf/Rrc) of the feedback resistor RF's resistance value Rrf to the current detection resistor (input resistor) RC's resistance value Rrc.

Now, with reference to FIG. 2, input/output characteristics of the operational amplifier CP will be described. The operational amplifier CP is an inverting amplifier circuit that inverts and amplifies the difference (Vref−VR) between one input voltage (reference voltage Vref) and the other input voltage (voltage signal VR). For example, it is assumed that the amplification factor (Rrf/Rrc) of the operational amplifier CP is 1, mirror current Im changes from positive current to negative current, voltage signal VR shifts from −5 V to +5 V, and reference voltage Vref is +5 V. When voltage signal VR is +5 V, the difference (Vref−VR) is inverted and amplified, and therefore, the value is calculated by the equation: (5 V−5 V)×1=0 V. Furthermore, when voltage signal VR is −5 V, the difference (Vref−VR) is inverted and amplified, and therefore, the value is calculated by the equation: (5 V+5 V)×1=10 V. That is, as FIG. 2 shows, the operational amplifier CP is a means for converting an input voltage (voltage signal VR), regardless of whether it is negative or positive, into a positive voltage signal CS when it is outputted. Moreover, it is also capable of converting it into a negative voltage signal. That is, in this embodiment, the current sensor 3 is a means for converting a current that flows through the current detection resistor RC, regardless of whether the current is positive or negative, into either a positive or negative voltage signal.

Furthermore, in this embodiment, as the following equation (1) shows, resistance value Rrc of the current detection resistor RC is determined so that, when current Imain flows through the parasitic diode D1 of the power MOSFET Q1, a value obtained as the result of the current Imain being divided by mirror ratio X (a value obtained as the result of the number of the power MOSFET's cells being divided by the number of the mirror MOSFET's cells) of the power MOSFET Q1 to the mirror MOSFET Q2 and then multiplied by the resistance value Rrc of the current detection resistor RC is less than voltage drop value VD1 of the power MOSFET Q1 or the parasitic diode D1.

$$Rrc \times (Imain/X) < VD1 \quad (1)$$

Herein, in equation (1), a value calculated by Imain/X is current Imo that flows through the mirror MOSFET Q2 when resistance value Rrc of the current detection resistor RC is 0 Ω. Therefore, the left side, Rrc×(Imain/X), of equation (1) is Rrc·Imo in an ideal state. If the above value is less than the voltage drop value VD1 of the power MOSFET Q1 or the parasitic diode D1 when a current is flowing, even when a current is flowing through the parasitic diode D1 of the power MOSFET Q1, a current which flows through the mirror MOSFET Q2 or the parasitic diode D2 changes according to the fluctuation of the current that flows through the power MOSFET Q1 or the parasitic diode D1.

When a current is flowing through each parasitic diode of the power MOSFET and the mirror MOSFET, the relationship between the current value and the voltage drop value of each parasitic diode is non-linear, and the current detection resistor is linear. Therefore, if equation (1) is not satisfied, when a current is flowing through each parasitic diode, a ratio of the current flowing through the power MOSFET to the current flowing through the mirror MOSFET changes according to the flowing current; and accordingly there is an area in which a voltage drop value of the current detection resistor is almost equal to that of the power MOSFET. In this area, current flowing through the mirror MOSFET seldom changes even if the current flowing through the power MOSFET increases or decreases; as a result, in this area, it is not possible to accurately detect current that flows through the power MOSFET.

Next, an explanation will be given with reference to FIG. 3. In FIG. 3, solid line A shows the relationship between current Imain flowing through the power MOSFET Q1 and current Im flowing through the mirror MOSFET when resistance value Rrc of the current detection resistor RC is specified so as to satisfy equation (1) as this embodiment shows. The current Imain and the current Im change linearly.

On the other hand, broken line B shows the relationship between current Imain and current Im when equation (1) is not satisfied. In the area where a voltage drop value of the current detection resistor is almost equal to that of the power MOSFET, as shown in the drawing, even if current Imain changes, current Im does not change. Therefore, the current Imain and the current Im change non-linearly.

For example, if load L is an AC (alternating current) motor used for hybrid automobiles, assuming that the maximum current Imain that flows through the power MOSFET Q1 is 1000 A and the mirror ratio X (a value obtained as the result of the number of the power MOSFET's cells being divided by the number of the mirror MOSFET's cells) of the power MOSFET Q1 to the mirror MOSFET Q2 is 1000, current Im that flows through the mirror MOSFET is 1 A. Assuming that voltage drop value VD1 of the power MOSFET Q1 or the parasitic diode D1 is 0.7 V, resistance value Rrc of the current detection resistor RC can be 0.7 Ω.

Conventionally, when a shunt resistor is connected in series to a motor, a load, to detect current, the resistance value of the shunt resistor is made as small as possible, several ohms. On the other hand, current that flows through the motor is large, as stated above, 1000 A. Therefore, a relatively large shunt resistor is required. However, in this embodiment, the resistance value of the current detection resistor RC is 0.7 Ω, as stated above, and maximum current that flows through is, for example, 1 A; therefore, a small chip resistor can be used for the current detection resistor RC. Since a chip resistor is not influenced by temperature, it can accurately detect current Im even if atmospheric temperature changes. Furthermore, a chip resistor can be installed on the circuit board of the operational amplifier CP. Moreover, a chip resistor is also used for the feedback resistor RF.

The current sensor 3 can accurately detect current that flows through the power MOSFET Q1 in both directions. That is, when main current Imain flows through the power MOSFET Q1 or the parasitic diode D1, mirror current Im which flows through the mirror MOSFET Q2 or the parasitic diode D2 can be expressed by the equation (2) below. Herein, Z1 denotes an impedance of the power MOSFET Q1 or the parasitic diode D1, Z2 denotes an impedance of the mirror MOSFET Q2 or the parasitic diode D2, Rrc denotes a resistance value of the current detection resistor RC, and X denotes a mirror ratio of the power MOSFET Q1 to the mirror MOSFET Q2.

$$Imain \cdot Z1 = Im \cdot (Z2 + Rrc) \geq (Imain/X) \cdot Rrc \quad (2)$$

The equation (2) can be developed as follows:

$$Im/Imain \geq Z1/(Z2 + Z1 \cdot X) \quad (3)$$

As equation (3) shows, a ratio of mirror current Im to main current Imain of the current sensor 3 is always equal to a value, indicated on the right side of equation (3), or more, and the value is determined according to the impedance Z1 of the power MOSFET Q1 or the parasitic diode D1, the impedance Z2 of the mirror MOSFET Q2 or the parasitic diode D2, and the mirror ratio X. Consequently, the value is almost constant regardless of the current that flows through the power MOSFET Q1. Accordingly, voltage signal VR that is converted by the current detection resistor RC changes according to the current that flows through the power MOSFET Q1 or the parasitic diode D1. Furthermore, because the voltage signal VR is inverted and amplified by means of an operational amplifier CP, the fluctuation of the current detection signal CS which is outputted from the operational amplifier CP is also amplified even if the fluctuation of the current flowing through the power MOSFET Q1 or the parasitic diode D1 is small. Thus, the current sensor 3 is capable of accurately detecting current that flows through the power MOSFET Q1 or the parasitic diode D1.

If the resistance value Rrc of the current detection resistor RC is 0.7 Ω and the maximum current that flows through the current detection resistor RC is 1 A, the maximum input voltage VR is 0.7 V. If mirror current Im becomes less than 1 A, input voltage VR becomes low accordingly. In the event that mirror current Im is low, the amplification factor (RF/RC) of the operational amplifier CP may be increased, for example, as much as twenty times so as to accurately detect current.

Furthermore, voltage signal VR of the current detection resistor RC can become positive or negative according to the direction of the current that flows through the power MOSFET Q1. However, because the voltage signal is inverted and amplified by the operational amplifier CP, current detection signal CS of the operational amplifier CP is always constant, either positive or negative, regardless of the direction of the current flowing through the power MOSFET Q1. Thus, the driving device 7 is capable of easily receiving the current detection signal CS. For example, in a driving device consisting of a microcomputer, it is possible to receive current detection signal CS via the microcomputer's A/D port. Furthermore, it is possible for the current sensor 3, shown in the same drawing, to consist of only a resistor and an operational amplifier thereby reducing cost.

As stated above, according to this embodiment, it is possible to accurately detect forward current and reverse current that flow through the parasitic diode of the power MOSFET. As a result, a current sensor that detects current that flows through the power MOSFET in both directions does not require a separate device or circuit (Hall element, or shunt resistor and sample-and-hold circuit) to detect current, which simplifies the device, increases reliability and reduces cost. Furthermore, the current detection signal can be easily inputted into a driving device, which does not require additional functions of the driving device that would increase costs. For example, in a driving device consisting of a microcomputer, it is possible to input current detection signal CS via the microcomputer's A/D port.

Next, with reference to FIGS. 4 and 5, the configuration of a current sensor according to a second embodiment of the present invention will be described.

Figure 4:
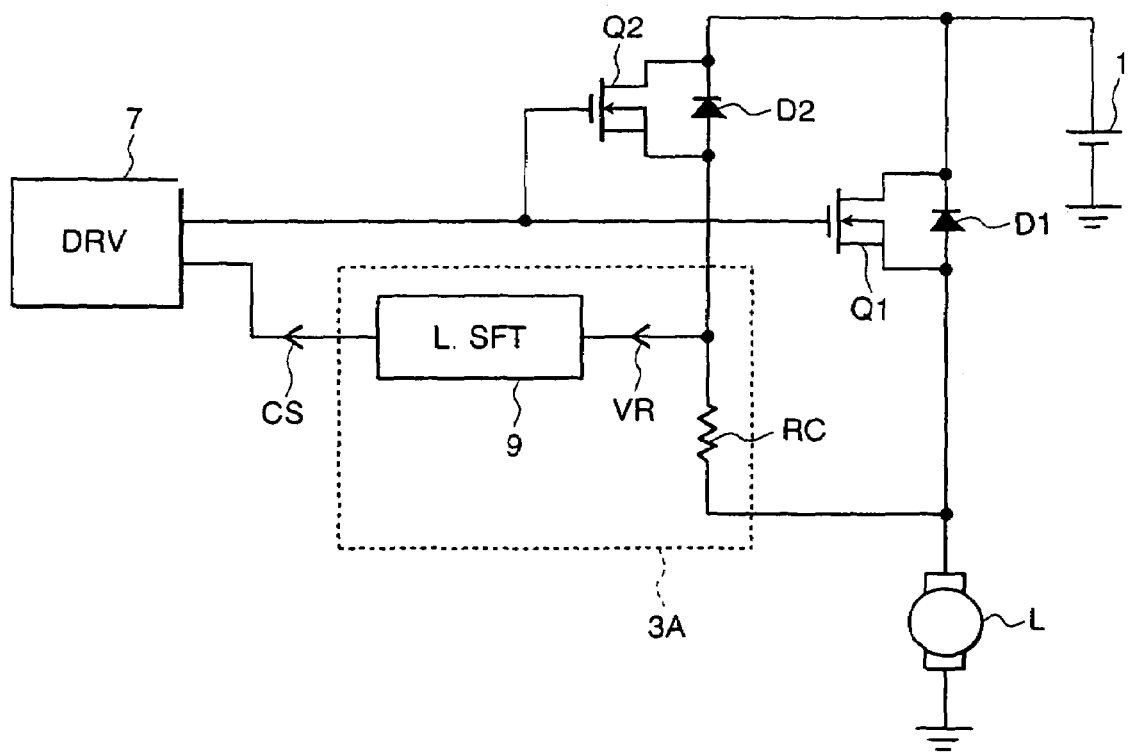
FIG. 4 is a circuit diagram which shows the configuration of a current sensor according to a second embodiment of the present invention.

FIG. 4 is a circuit diagram that shows the configuration of a current sensor according to a second embodiment of the present invention. FIG. 5 is an explanatory diagram that explains characteristics of the level shift circuit used for a current sensor according to a second embodiment of the present invention. Moreover, items in FIGS. 4 and 5 are identical to those in FIG. 1 when the same alphanumeric characters appear.

As shown in FIG. 4, in this embodiment, a current detection circuit 3A consists of a level shift circuit 9 and a current detection resistor RC. Herein, the resistance value of the current detection resistor RC is specified in the same manner as the current sensor 3 shown in FIG. 1.

Figure 5:
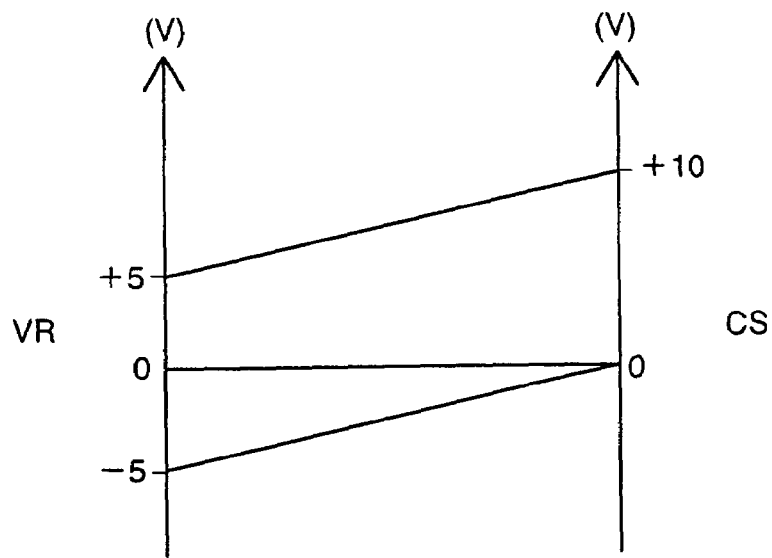
FIG. 5 is an explanatory diagram which explains characteristics of the level shift circuit used for a current sensor according to a second embodiment of the present invention.

As FIG. 5 shows, when voltage signal VR of the current detection resistor RC changes, for example, from −5 V to +5 V, the level shift circuit 9 converts the voltage level of the voltage signal VR by +5 V, thereby converting current detection signal CS so that it changes from 0 V to +10 V. Consequently, the driving device 7 can easily receives current detection signal CS. Furthermore, since it is possible for a current sensor 3A to consist of only a resistor and a level converting circuit, the result would be a cost reduction.

As stated above, in this embodiment, a separate device or circuit (Hall element, or shunt resistor and sample-and-hold circuit) is not necessary for current detection; and currents in both positive and negative directions can also be detected.

Next, with reference to FIG. 6, the configuration of a current sensor according to a third embodiment of the present invention will be described.

Figure 6:
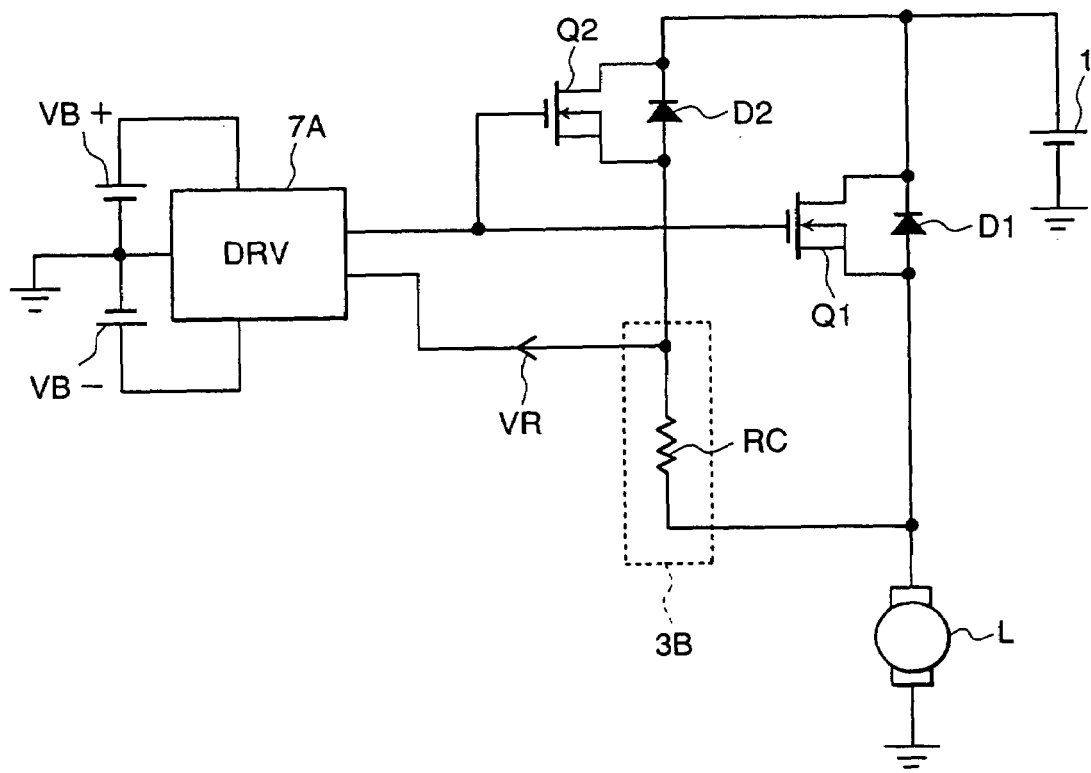
FIG. 6 is a circuit diagram which shows the configuration of a current sensor according to a third embodiment of the present invention.

FIG. 6 is a circuit diagram that shows the configuration of a current sensor according to a third embodiment of the present invention. Items in FIG. 6 are identical to those in FIG. 1 when the same alphanumeric characters appear.

In this embodiment, a current sensor 3B consists of only a current detection resistor RC. Herein, the resistance value of the current detection resistor RC is specified in the same manner as the current sensor 3 shown in FIG. 1. Voltage signal VR of the current detection resistor RC is directly inputted into the driving device 7A.

On the other hand, the driving device 7A is driven by a positive power supply VB+ and a negative power supply VB−. This enables the driving device 7 to capture both positive and negative voltage signals VR, thereby accurately detecting currents that flow through the power MOSFET Q1 in both directions.

As stated above, in this embodiment, a separate device or circuit (Hall element, or shunt resistor and sample-and-hold circuit) is not necessary for current detection, and currents in both positive and negative directions can be detected.

Next, with reference to FIGS. 7 through 9, the configuration of a PWM inverter that uses a current sensor according to a first embodiment of the present invention will be described. Herein, a PWM inverter controls three-phase alternating current by using a current sensor.

Figure 7:
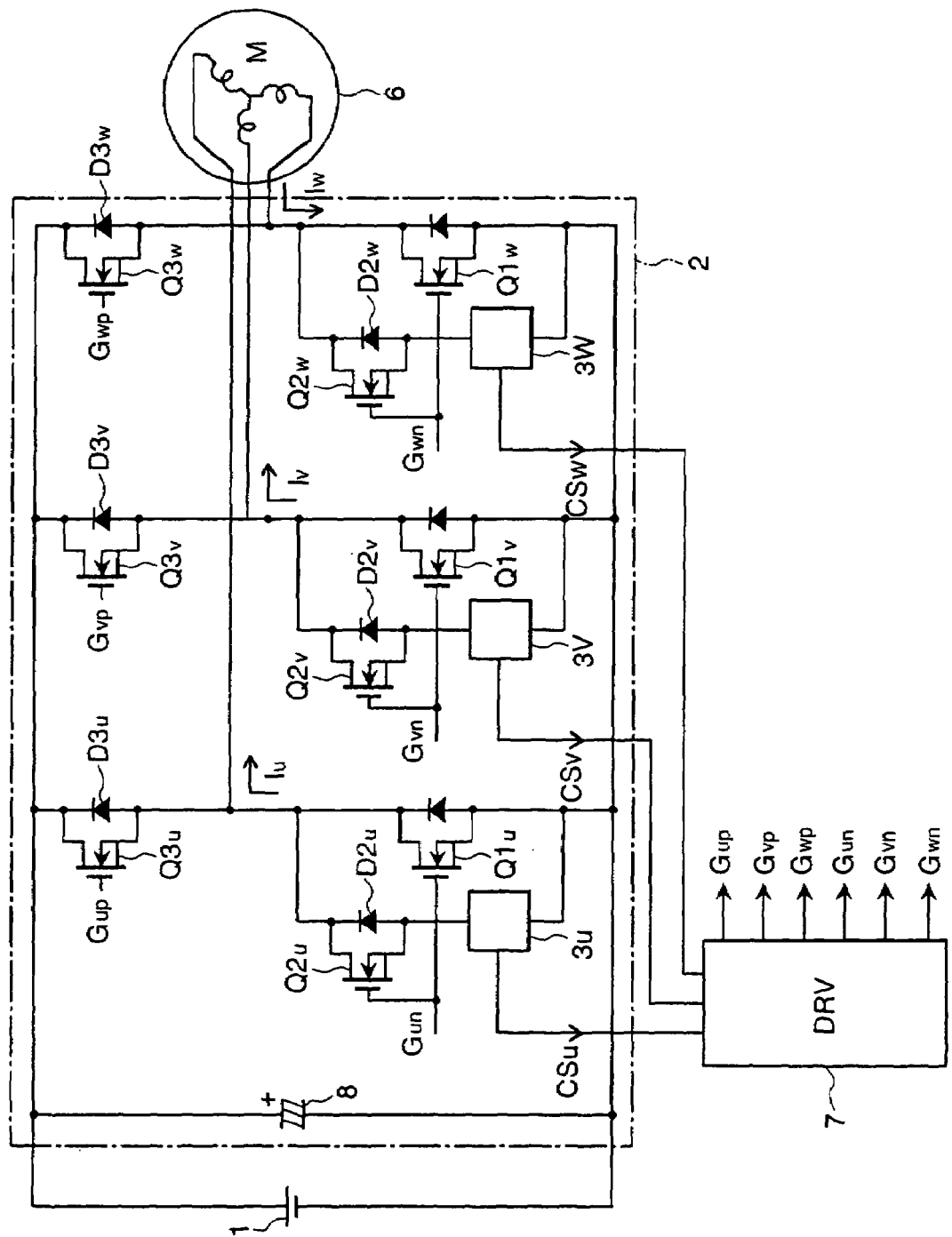
FIG. 7 is a circuit diagram which shows the configuration of the PWM inverter that uses a current sensor according to a first embodiment of the present invention.

FIG. 7 is a circuit diagram that shows the configuration of the PWM inverter that uses a current sensor according to a first embodiment of the present invention. Items in FIG. 7 are identical to those in FIG. 1 when the same alphanumeric characters appear.

In FIG. 7, a PWM inverter consists of an inverter main circuit 2, current sensors 3U, 3V and 3W, a driving device 7 and an electrolytic capacitor 8. The PWM inverter converts a direct current output voltage of the DC power source 1 into a three-phase alternating current and supplies the three-phase output current to an AC motor 6, a load. Moreover, the electrolytic capacitor 8 is connected in parallel to the DC power source 1.

The inverter main circuit 2 consists of three phases (U phase, V phase and W phase) of arms; and each phase consists of an upper arm and a lower arm that function in pairs and have switching elements. The lower arm switching elements are power MOSFETs Q1$u$, Q1$v$, Q1$w$ and mirror MOSFETs Q2$u$, Q2$v$, Q2$w$ wherein their gate electrodes and drain electrodes are connected in common. The gate electrodes Gun, Gvn and Gwn are connected to the driving device 7. Current sensors 3U, 3V and 3W are connected between each source electrode of the power MOSFETs Q1$u$, Q1$v$, Q1$w$ and each source electrode of the mirror MOSFETs Q2$u$, Q2$v$, Q2$w$, respectively. Furthermore, due to the MOSFET structure, the power MOSFETs Q1$u$, Q1$v$, Q1$w$ and the mirror MOSFETs Q2$u$, Q2$v$, Q2$w$ have parasitic diodes D1$u$, D1$v$, D1$w$, D2$u$, D2$v$ and D2$w$, respectively. The upper arm switching elements are power MOSFETs Q3$u$, Q3$v$ and Q3$w$. Their gate electrodes Gup, Gvp and Gwp are connected to the driving device 7 as well. Furthermore, the power MOSFETs Q3$u$, Q3$v$ and Q3$w$ also have parasitic diodes D3$u$, D3$v$ and D3$w$, respectively. The driving device 7 turns ON and OFF each switching element by means of PWM (Pulse Width Modulation) signals to control current that flows through the AC motor 6.

Moreover, as an upper arm switching element, an IGBT (Insulated Gate Bipolar Transistor) connected in parallel to a flywheel diode, or a mirror MOSFET and a power MOSFET, in the same manner as the lower arm switching element, can be used. Each of the current sensors 3U, 3V and 3W is the same as the current sensor 3 shown in FIG. 1. Current detection signals CSu, CSv and CSw outputted from current sensors 3U, 3V and 3W, respectively, are inputted into the driving device 7.

In the PWM inverter, during the period when all of the power MOSFETs Q3$u$, Q3$v$ and Q3$w$ of the upper arm are turned OFF within the period when PWM signals of the driving device 7 switch, the driving device 7 receives each of the current detection signals CSu, CSv and CSw sent from current detection circuits 3U, 3V and 3W, respectively.

Next, with reference to FIG. 8, an explanation will be made about PWM signals which are supplied by the driving device 7 to the gate electrodes Gun, Gvn and Gwn of the power MOSFETs Q1$u$, Q1$v$ and Q1$w$ and the mirror MOSFETs Q2$u$, Q2$v$ and Q2$w$, and the gate electrodes Gup, Gvp and Gwp of the power MOSFETs Q3$u$, Q3$v$ and Q3$w$.

Figure 8:
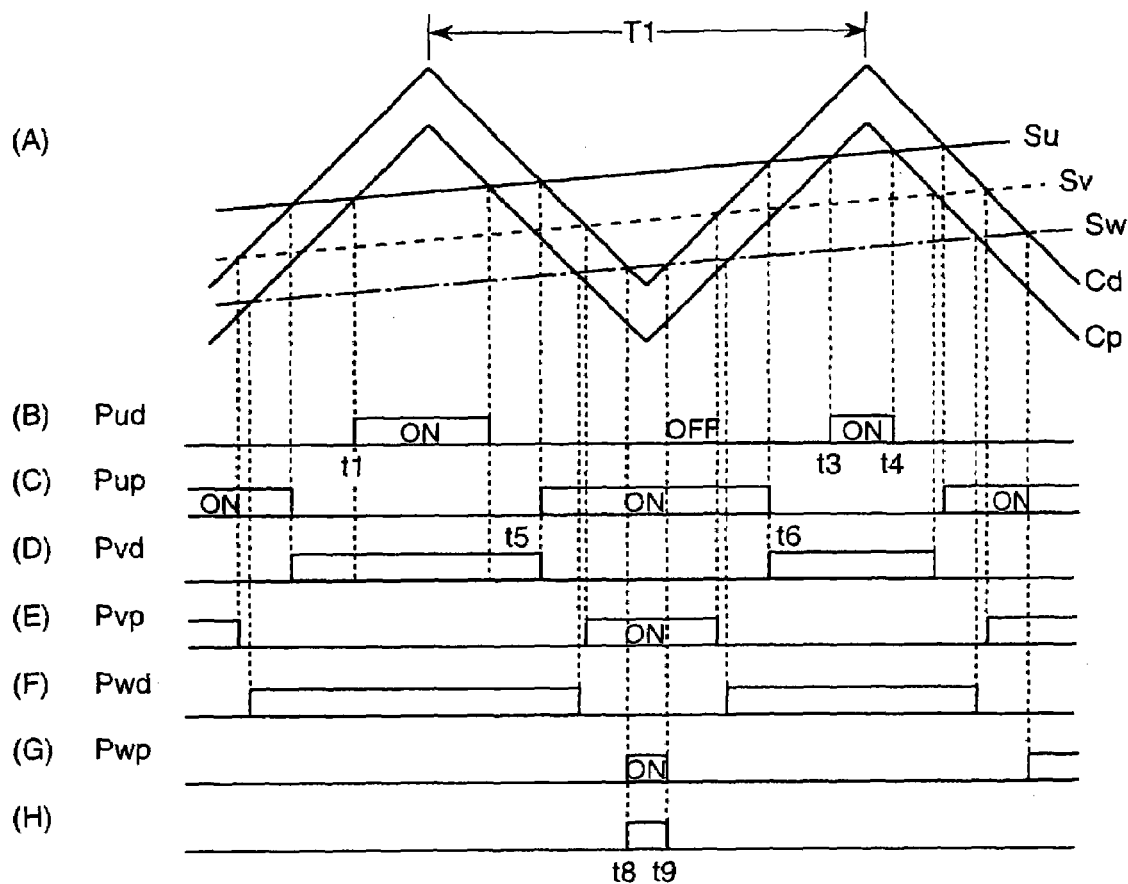
FIG. 8 is an enlarged view of the PWM signal.

FIG. 8 is an enlarged view of the PWM signal.

FIG. 8(A) shows carrier Cp for the upper arm, carrier Cd for the lower arm, U-phase drive voltage signal Su, V-phase drive voltage signal Sv, and W-phase drive voltage signal Sw. Herein, triangular wave signals are used for carriers Cp and Cd. Assuming that period T1 is, for example, 100 µs, a carrier is a 10-kHz signal.

FIG. 8(B) shows PWM signal Pud that is supplied by the driving device 7 to the gate electrode Gun of the power MOSFET Q1$u$ and the mirror MOSFET Q2$u$. When the level of the carrier Cd for the lower arm is higher than the level of the U-phase drive voltage signal Su, for example, between time t1 and t2 and between time t3 and t4, the PWM signal is turned ON. In the reverse case, between time t2 and t3, the PWM signal is turned OFF.

FIG. 8(C) shows PWM signal Pup that is supplied by the driving device 7 to the gate electrode Gup of the power MOSFET Q3$u$. When the level of the carrier Cp for the upper arm is lower than the level of the U-phase drive voltage signal Su, for example, between time t5 and t6, the PWM signal is turned ON. In the reverse case, the signal is turned OFF.

Similarly, FIG. 8(D) shows PWM signal Pvd which is supplied by the driving device 7 to the gate electrode Gvn of the power MOSFET Q1$v$ and the mirror MOSFET Q2$v$. FIG. 8(E) shows PWM signal Pvp which is supplied by the driving device 7 to the gate electrode Gvp of the power MOSFET Q3$v$. FIG. 8(F) shows PWM signal Pwd which is supplied by the driving device 7 to the gate electrode Gwn of the power MOSFET Q1$w$ and the mirror MOSFET Q2$w$. FIG. 8(G) shows PWM signal Pwp which is supplied by the driving device 7 to the gate electrode Gwp of the power MOSFET Q3$w$.

Looking at FIG. 8(B) through FIG. 8(G) wholly, as FIG. 8(H) shows, between time t8 and t9, PWM signals Pup, Pvp and Pwp, which are supplied to the gate electrodes Gup, Gvp and Gwp of the power MOSFETs Q3$u$, Q3$v$ and Q3$w$ that consist of the upper arm, are all turned OFF. On the other hand, PWM signals Pud, Pvd and Pwd, which are supplied to the gate electrodes Gun, Gvn and Gwn of the power MOSFETs Q1$u$, Q1$v$, Q1$w$ and the mirror MOSFETs Q2$u$, Q2$v$ and Q2$w$ that consist of the lower arm, are all turned ON.

At this point, as FIG. 7 shows, U-phase current Iu and V-phase current Iv flow into the motor 6 through the lower arm, and from the motor 6, W-phase current Iw flows out through the lower arm. Therefore, U-phase current Iu, V-phase current Iv and W-phase current Iw can be detected by the current sensors 3U, 3V and 3W, respectively, which are located in the lower arm.

As FIG. 8(A) clearly shows, between time t8 and t9 shown in FIG. 8(H), the time at which the carrier Cp of the upper arm and the carrier Cd of the lower arm become their minimum values is included. Therefore, by receiving currents detected by the current sensors 3U, 3V and 3W at the time when the carriers Cp and Cd become their minimum values, accurate current detection is possible.

Next, with reference to FIG. 9, the relationship between the PWM signal and the current detection timing will be described.

Figure 9:
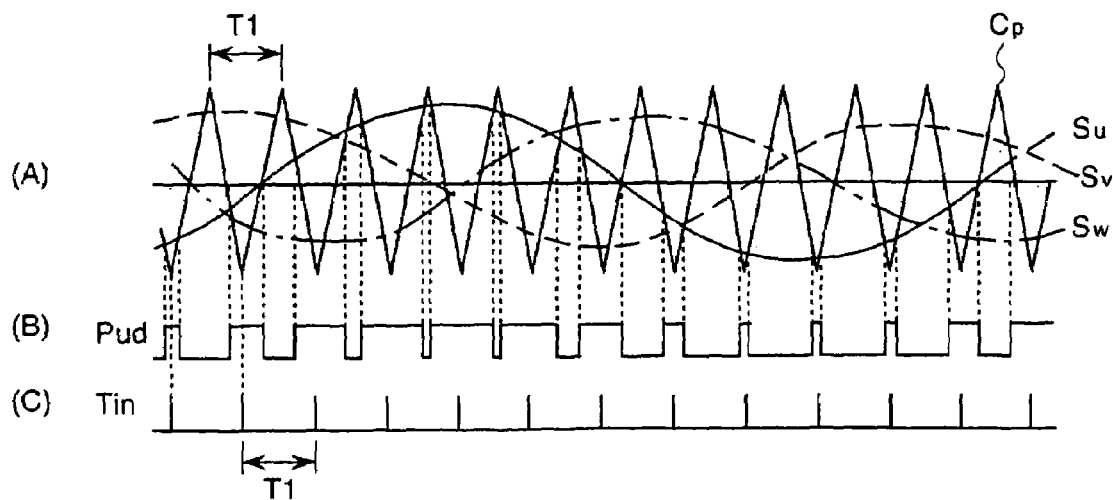
FIG. 9 is an explanatory diagram that explains the PWM signal and the current detection timing.

FIG. 9 is an explanatory diagram that explains the PWM signal and the current detection timing.

FIG. 9(A) shows carrier Cp for the upper arm, U-phase drive voltage signal Su, V-phase drive voltage signal Sv and W-phase drive voltage signal Sw. Period T1 of the carrier Cp is equal to period T1 shown in FIG. 8(A), for example, 100 µs.

In the same manner as shown in FIG. 8(B), FIG. 9(B) shows PWM signal Pud which is supplied by the driving device 7 to the gate electrode Gun of the power MOSFET Q1$u$ and the mirror MOSFET Q2$u$.

FIG. 9(C) shows current detection timing Tin. As shown in the drawing, at the time when the carrier Cp becomes a minimum value, currents detected by the current sensors 3U, 3V and 3W are captured. The driving device 7 has a built-in A/D converter, and current detection signals CSu, CSv and CSw outputted from current sensors 3U, 3V and 3W, respectively, are inputted into the A/D converter's input port. Therefore, the driving device 7 starts A/D conversion of the currents detected by the current sensors 3U, 3V and 3W at the time when the internally created carrier Cp becomes a minimum value, thereby enabling accurate current detection. Period T1 of current capture timing Tin is 100 µs in the example shown in the drawing, and if currents are detected to this degree of time intervals, accurate current detection is possible.

The current capture operation is executed every switching period T1, thereby the driving device 7 detects currents that flow through the AC motor 6. That is, as the result of the upper arm power MOSFETs Q3$u$, Q3$v$ and Q3$w$ being turned OFF, current flowing through each phase flows through the power MOSFETs Q1$u$, Q1$v$ and Q1$w$ and a portion of the current flows through the mirror MOSFETs Q1u, Q1v, Q1w, or the parasitic diodes D1u, D1v, D1w, D2u, D2v and D2w. Because current sensors 3U, 3V and 3W are capable of detecting currents that flow through the power MOSFETs Q1u, Q1v, Q1w, or the parasitic diodes D1u, D1v, D1w in both directions, it is possible to detect current of each phase by capturing current detection signals CSu, CSv and CSw by means of the driving device 7 during this period. The driving device 7 controls PWM signals so that detected current becomes a predetermined value, thereby controlling alternating current.

Furthermore, the driving device 7 senses a failure of current sensors 3U, 3V and 3W or an electrical short circuit occurring at a connection between the inverter main circuit 2 and the AC motor 6 based on the sum of the each phase's detected current value. This is because, in an equivalently Y-connected circuit, the sum of each current is 0 according to the Kirchhoff's law. That is, if the sum of the detected current values is larger than the sum of the current detection measurement errors of the current sensors 3U, 3V and 3W, it is determined that there is a failure of current sensors 3U, 3V and 3W or an electrical short circuit occurring at a connection between the inverter main circuit 2 and the AC motor 6. As a result, the driving device 7 turns OFF all of the power MOSFETs Q1u, Q1v, Q1w, Q3u, Q3v and Q3w and the mirror MOSFETs Q2u, Q2v and Q2w in order to prevent an overcurrent or a short circuit from occurring, thereby preventing serious accidents, such as smoke emission or fire. Furthermore, the PWM inverter, shown in FIG. 7, does not use an insulated current sensor such as a Hall element or a current detection means which uses a shunt resistor and a sample-and-hold circuit, thereby making it possible to reduce size and cost of the PWM inverter.

Moreover, a current sensor used for the PWM inverter is not limited to one shown in FIG. 1. A current sensor 3A shown in FIG. 4 or a current detection resistor 3B and a driving device 7A shown in FIG. 6 can be applied.

As stated above, it is possible for a current sensor to detect current that flows through each phase of the PWM inverter according to this embodiment. Accordingly, an insulated current sensor or a current detection means that uses a shunt resistor and a sample-and-hold circuit is not necessary, thereby making it possible to reduce size and cost of the device. Furthermore, it is also possible to detect a failure of the current sensor or the occurrence of an electrical short circuit at a connection between the inverter main circuit and the AC motor. This prevents an overcurrent or a short circuit from occurring, thereby preventing serious accidents, such as smoke emission or fire.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A current sensor comprising:
    a power MOSFET connected between an electric load and a power source, for controlling current that flows through said electric load;
    a mirror MOSFET connected in parallel to said power MOSFET, such that a current that flows through said mirror MOSFET is equal to a portion of a current that flows through said power MOSFET;
    a current detection resistor connected between a source electrode of said power MOSFET and a source electrode of said mirror MOSFET; and
    a converting means for converting both positive and negative voltages generated across said current detection resistor into a current detection signal that is always positive or is always negative;
    wherein said current detection resistor has a resistance value Rrc such that a value obtained as the result of a current Imain, which flows through said power MOSFET or a parasitic diode of said power MOSFET, divided by a mirror ratio X of said power MOSFET to said mirror MOSFET, and multiplied by the resistance value Rrc is less than a voltage drop value VD of said power MOSFET or of the parasitic diode of said power MOSFET, when said current is flowing.

2. The current sensor according to claim 1, wherein said converting means is an inverting amplifier circuit that inverts and amplifies a voltage signal, which has been converted into voltage by said current detection resistor, and outputs the signal.

3. The current sensor according to claim 1, wherein said converting means is a level converting circuit that increases or decreases the level of the voltage signal, which has been converted into voltage by said current detection resistor.

4. The current sensor according to claim 1, further comprising an A/D converter which receives said current detection signal and generates digital signals indicative thereof.

5. A PWM inverter having three phases of arms, connected in parallel to a DC power source, each phase having an upper arm and a lower arm which function in pairs so as to control alternating current, and current sensors disposed at all of the upper or lower arms of said three phases; wherein said current sensor comprises:
    a power MOSFET, connected between an electric load and a power source, for controlling current that flows through said electric load;
    a mirror MOSFET, connected in parallel to said power MOSFET, whereby a portion of the current that flows through said power MOSFET flows through said mirror MOSFET;
    a current detection resistor connected between a source electrode of said power MOSFET and a source electrode of said mirror MOSFET; and
    a converting means for converting positive and negative voltages generated across said current detection resistor into a positive or negative voltage; and
    wherein said PWM inverter further comprises a driving device for detecting each phase's current based on a current detection signal outputted from the current sensor of each phase.

6. The PWM inverter according to claim 5, wherein the driving device detects a failure of the current sensor based on a sum of each phase's current.

7. The PWM inverter according to claim 5, wherein:
    the PWM inverter is configured for connection to a motor; and
    the driving device detects an electrical short between the PWM inverter and the motor based on a sum of each phase's current.

* * * * *